United States Patent
Selvarajan

(10) Patent No.: US 9,661,886 B1
(45) Date of Patent: May 30, 2017

(54) SYSTEM AND METHOD FOR CAPTURING DESIGN STATE OF APPAREL OR ACCESSORY TO ENABLE EXTRAPOLATION FOR STYLE AND SIZE VARIANTS

(71) Applicant: VPERSONALIZE INC, San Francisco, CA (US)

(72) Inventor: Balamurugan Selvarajan, Bangalore (IN)

(73) Assignee: V Personalize Inc., San Francisco, CA (US)

(*) Notice: Subject to any disclaimer, the term of this patent is extended or adjusted under 35 U.S.C. 154(b) by 0 days.

(21) Appl. No.: 15/266,922

(22) Filed: Sep. 15, 2016

Related U.S. Application Data

(60) Provisional application No. 62/336,737, filed on May 15, 2016.

(51) Int. Cl.
| | | |
|---|---|---|
| *G06F 19/00* | (2011.01) | |
| *A41H 3/00* | (2006.01) | |
| *G05B 17/02* | (2006.01) | |
| *G05B 19/042* | (2006.01) | |

(52) U.S. Cl.
CPC ............ *A41H 3/007* (2013.01); *G05B 17/02* (2013.01); *G05B 19/0426* (2013.01); *G05B 2219/32359* (2013.01); *G05B 2219/45196* (2013.01)

(58) Field of Classification Search
CPC .. A41H 3/007; G05B 17/02; G05B 19/32359; G05B 19/45196
USPC .................................................. 700/130–133
See application file for complete search history.

(56) References Cited

U.S. PATENT DOCUMENTS

| | | | | |
|---|---|---|---|---|
| 4,823,714 A | * | 4/1989 | Yokoe .................... | D05B 19/08 112/103 |
| 4,926,344 A | * | 5/1990 | Collins .................. | A41H 3/007 700/132 |
| 5,558,032 A | * | 9/1996 | Muto ...................... | D05B 19/08 112/102.5 |
| 5,692,448 A | * | 12/1997 | Shigeta .................. | D05B 19/08 112/102.5 |
| 5,757,661 A | * | 5/1998 | Surville ............... | G06Q 10/043 700/131 |
| 9,406,172 B2 | * | 8/2016 | Selvarajan ............. | A41H 3/007 |
| 2004/0049309 A1 | * | 3/2004 | Gardner .................. | A41H 1/00 700/132 |
| 2008/0114484 A1 | * | 5/2008 | Zickenberg ............ | D05B 19/10 700/138 |

(Continued)

*Primary Examiner* — Nathan Durham

(57) ABSTRACT

This invention outlines a novel method for capturing the "state" of an intended design on an apparel pattern, and subsequently transforming that "state" to a new style or size and then applying that modified "state" to automatically recreate the original design, but for the new style or size. This invention captures the "state" of a design as a mathematical function, rather than the design itself and then applies a series of transformations to that "state" to map it to a new style. The system and method enables designers to seamlessly extrapolate designs across apparels and accessories of various sizes and styles. The automated system and method obviates the need for creating individual designs for each style or size, while ensuring that the transformed designs retain their visual characteristics even upon extrapolation.

6 Claims, 6 Drawing Sheets

(56) References Cited

U.S. PATENT DOCUMENTS

| | | | |
|---|---|---|---|
| 2008/0312765 A1* | 12/2008 | Gardiner | A41H 1/00 700/132 |
| 2015/0066189 A1* | 3/2015 | Mulligan | G06Q 30/0621 700/136 |
| 2015/0339800 A1* | 11/2015 | Selvarajan | A41H 3/007 345/419 |
| 2015/0351477 A1* | 12/2015 | Stahl | G06T 15/04 700/132 |

* cited by examiner

SYSTEM AND METHOD FOR CAPTURING DESIGN STATE OF APPAREL OR ACCESSORY TO ENABLE EXTRAPOLATION FOR STYLE AND SIZE VARIANTS

CROSS-REFERENCE TO RELATED APPLICATION

This present application claims the priority of the Indian Provisional Patent application with the No. 62/336,737 filed on May 15, 2016 and entitled, "A SYSTEM AND METHOD FOR CAPTURING DESIGN STATES AND ENABLING EXTRAPOLATION FOR STYLE VARIANTS", and the contents of which is included entirely as reference herein.

BACKGROUND

Technical Field

The present disclosure relates to the field of apparel design. Particularly, the present disclosure relates to automation of apparel designing. More particularly, the present disclosure relates to automation of styling of apparel designs.

Description of Related Art

Customizing apparels by adding various designs thereto is a prevalent phenomenon. Several tools, including computerized tools as well as non-computerized tools are available for generating/customizing design patterns, and for printing the design patterns. A designer, during the course of his work typically designs/customizes patterns based on the size of the apparel to which the design pattern is purported to be applied.

For instance, a design pattern for a Men's crew shirt significantly differs from the design pattern for a Women's v-neck shirt. Further, design patterns also varies based upon the manner in which the garment is styled. For instance, a design pattern applicable to a half-sleeved shirt would be different from a design pattern applicable for full-sleeved shirt. Further, a design pattern applicable to a polo-neck shirt would be different from a design pattern applicable for a V-neck shirt.

Given the fact that design patterns vary based upon the styling and size of the garment inter-alia, a designer is forced to create individual design patterns for every type/size/style of garments. In order to overcome the aforementioned drawback, designers started designing patterns in accordance to a predetermined dimension. For instance, a designer would create a design pattern either in line with a largest possible size of the garment or a smallest possible size of the garment, and would thereafter customize the design pattern so as to suit the variations in garment size. Typically, a designer would create a design pattern based on a predetermined dimension, and would thereafter selectively enlarge and minimize the design pattern to suit various types/styles of garments.

However, one of the most prevalent drawbacks associated with the aforementioned techniques is that the design patterns tend to lose their original characteristics when trimmed or enlarged. Therefore, a trimmed design pattern and an enlarged design pattern may have variations or lose aspect ratio in comparison to the original design pattern.

Hence there is a need for a computer implemented system and method that enables designers to extrapolate the design pattern to various sizes without making compromises in terms of the quality of representation of the design pattern.

Further there is a need for a computer implemented system and method that does not necessitate designers to visually create individual design patterns for every apparel type/size, but rather enables them to use a single design pattern across several garment types/sizes automatically.

The new art described in this invention provides for a single garment design to be automatically utilized across multiple garments or accessories of different sizes and styles, thereby saving time, while retaining the accuracy of the visual design.

The above mentioned shortcomings, disadvantages and problems are addressed herein and which will be understood by reading and studying the following specification.

Objects of the Embodiments Herein

A primary object of the present disclosure is to provide a computer implemented system and method that enables designers to seamlessly extrapolate design patterns across apparels of various sizes and types.

Another object of the present disclosure is to provide a computer implemented system and method that obviates the need for creating individual design patterns for respective apparel types/sizes.

Yet another object of the present disclosure is to provide a computer implemented system and method that ensures that the design patterns retain their characteristics even upon extrapolation to various sizes.

Yet another object of the present disclosure is to make available a computer implemented system and method that provides for a single garment design to be utilized across multiple garments or accessories of different sizes and types.

Yet another object of the present disclosure is to provide a computer implemented system and method that is user friendly.

Yet another object of the present disclosure is to provide a computer implemented system and method that enables automatic recreation of design patterns for garments of different sizes and types.

These and other objects and advantages of the present disclosure will become readily apparent from the following detailed description taken in conjunction with the accompanying drawings.

SUMMARY

The embodiments here discloses a computer implemented method for capturing the state of a design pattern embedded on a garment component, for subsequent modification to a different style. The 'design state' is expressed as a combination of a predetermined affine transformation and attributes corresponding to the pattern, text and colors making up the design pattern. The captured designed state is then transformed in accordance with a new style and then applied, preferably individually to the images, text and colors, thereby automatically recreating the original design, but for the garment components embodying the new style.

According to one embodiment herein, the 'design state' is a set of conditions unique to a design pattern embedded on a garment component. The 'design state' is characterized by at least the position of the design pattern on the garment component, the (background and foreground) color of the design pattern, art or image used in the design pattern, text used in the design pattern, font of the text used in the design pattern, scale factor associated with the design pattern, translation factor associated with the design pattern, rotational angles associated with the design pattern, design layers associated with the design pattern.

According to another embodiment herein, the 'design state' once determined is stored, preferably in any well-known data interchange format for subsequent use. The examples of data interchange formats include XML (Extensible Markup Language), and JSON (JavaScript Object Notation). Preferably, the 'design state' is determined/identified using an electronic device having data processing capabilities (for example, a computer, a laptop and a smart phone), and the determined 'design state' is stored and subsequently manipulated using a centralized computer server.

According to one embodiment herein, the 'design state' pertaining to a design pattern is identified using an electronic device having data processing capabilities, while the translation factor, scale factor, rotational factor inter-alia are calculated at the centralized computer server, subsequent to receiving the determined 'design state' from the electronic device. It is also permissible that an affine transformation is applied onto the design state at the server end rather that at the electronic device, possibly at a point of time different than the time of identification of the design state, thereby ensuring that only the 'design state' is transmitted across the computer network rather than the design pattern itself, and providing design transformation/modification to be performed on a remotely located server, independent of the electronic device that determined/captured the design state.

According to an embodiment herein, a computer implemented method is provided for capturing a design state corresponding to a design pattern embedded on a garment pattern or component and transforming captured design state to incorporate dimensional or shape variations. The method comprises instructions stored on a non-transitory computer readable storage medium and executed on a computing device comprising a hardware processor and memory for capturing a design state corresponding to a design pattern embedded on a garment pattern or component and transforming captured design state to incorporate dimensional or shape variations thereto. The method comprising the steps of identifying a design state representing one or more design pattern embedded on the garment component with a designer module. The design state comprises at least an original height and original width of the design patterns, a first coordinate pair indicating a center point of the design pattern. An original height and an original width of the garment component are identified. An alteration height and alteration width corresponding to the garment component are further identified. A scale factor is calculated based at least on the original height, original width, alteration height and alteration width corresponding to the garment component, using a designer computing system. A plurality of translation factors is calculating with the designer computing system based at least on said original height, original width, alteration height, alteration width corresponding to the garment component and the scale factor. At least the scale factor and the plurality of translation factors are provided as inputs to the computing system through an input device/application interface for an affine transformation operation. The affine transformation operation is executed based on the design state. The affine transformation is performed to modify and reposition each of the original design patterns to the altered width, height and position of the garment component.

According to an embodiment herein, the step of identifying the design state representing the design pattern, further includes the step of identifying at least colors included in the design pattern, textual data embedded on the design pattern, order of arrangement of textual data and colors, and font corresponding to the textual data.

According to an embodiment herein, the step of modifying the original height and original width of the design pattern in accordance with the scaling factor, further includes the following steps of changing the original height and the original width based on the scaling factor; repositioning the first coordinate pair in accordance with the scaling factor, computing an alteration height and alteration width corresponding to the design pattern based on the original height and original width of the design pattern and the scaling factor; and generating a modified design pattern based on the computed alteration height and alteration width corresponding to the design pattern as a characteristic of the design state representative of the design pattern.

According to an embodiment herein, the step of calculating the scale factor further includes the following steps of calculating a first quotient by performing a division operation with the computing system. The first quotient is computed by dividing the alteration width by original width. A second quotient is calculated by performing a division operation with the computing system. The second quotient is computed by dividing the alteration height by original height. The first quotient is compared with the second quotient. The first quotient is selected as the scaling factor only when the first quotient is greater than the second quotient. The second quotient is selected as the scaling factor only when the second quotient is greater than the first quotient.

According to an embodiment herein, the step of calculating the translation factors, further includes the following steps of calculating a first translation factor indicative of transformation of the design pattern in terms of width based on at least the original width of the design pattern, an alteration width corresponding to the design pattern and the scaling factor. A second translation factor indicative of transformation of the design pattern in terms of height is calculated, based on at least the original height of the design pattern, alteration height corresponding to the design pattern and the scaling factor. The first translation or second translation is used for the design transformation accordingly when the first quotient or the second quotient is selected as the scaling factor.

According to an embodiment herein, the step of identifying the design state is performed independently, with the identification of the scale factor, translation factors and the execution of the affine transformation on the said design state being done at a different point in time, on the same or on a different computing device.

According to an embodiment herein, a computer system is provided for capturing a design state corresponding to a design pattern embedded on a garment pattern or component and transforming captured design state to incorporate dimensional or shape variations. The system has software modules comprising instructions executed on a computing device comprising a hardware processor and memory for capturing a design state corresponding to a design pattern embedded on a garment pattern or component and transforming captured design state to incorporate dimensional or shape variations thereto.

According to an embodiment herein, the system comprises a user computing device connected to a designer computing system. The designer computing device is provided with a designer tool for designing a pattern. A design state extraction module is provided to identifying a design state representing one or more design pattern embedded on the garment component. The design state comprises at least an original height and original width of the design patterns, a first coordinate pair indicating a center point of the design pattern. An original height and an original width of the garment component are identified. An alteration height and alteration width corresponding to the garment component are further identified. A scale factor is calculated based at least on the original height, original width, alteration height and alteration width corresponding to the garment component, using a designer computing system. A plurality of translation factors is calculated with the designer computing system based at least on said original height, original width, alteration height, alteration width corresponding to the garment component and the scale factor. At least the scale factor and the plurality of translation factors are provided as inputs to the designer computing system through an input device/interface for an affine transformation operation. The affine transformation operation is executed based on the design state. The affine transformation is performed to modify and reposition each of the original design patterns to the altered width, height and position of the garment component.

According to an embodiment herein, the designer state extraction module is configured to identify the design state representing the design pattern, by identifying at least colors included in the design pattern, textual data embedded on the design pattern, order of arrangement of textual data and colors, and font corresponding to the textual data.

According to an embodiment herein, the designer tool/module is configured to modify the original height and original width of the design pattern in accordance with the scaling factor, by changing the original height and the original width based on the scaling factor; repositioning the first coordinate pair in accordance with the scaling factor; computing an alteration height and alteration width corresponding to the design pattern based on the original height and original width of the design pattern and the scaling factor; and generating a modified design pattern based on the computed alteration height and alteration width corresponding to the design pattern as a characteristic of the design state representative of the design pattern.

According to an embodiment herein, the designer computing system is configured to calculate the scale factor by calculating a first quotient by performing a division operation with the computing system. The first quotient is computed by dividing the alteration width by original width. A second quotient is calculated by performing a division operation with the computing system. The second quotient is computed by dividing the alteration height by original height. The first quotient is compared with the second quotient. The first quotient is selected as the scaling factor only when the first quotient is greater than the second quotient. The second quotient is selected as the scaling factor only when the second quotient is greater than the first quotient.

According to an embodiment herein, the designer computing system is configured to calculate the translation factors, by calculating a first translation factor indicative of transformation of the design pattern in terms of width based on at least the original width of the design pattern, an alteration width corresponding to the design pattern and the scaling factor. A second translation factor indicative of transformation of the design pattern in terms of height is calculated, based on at least the original height of the design pattern, alteration height corresponding to the design pattern and the scaling factor. The first translation or second translation is used for the design transformation accordingly when the first quotient or the second quotient is selected as the scaling factor.

According to an embodiment herein, the design state is identified independently, with the identification of the scale factor, translation factors and the execution of the affine transformation on the said design state being done at a different point in time, on the same or on a different computing device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof and the embodiments herein include all such modifications.

BRIEF DESCRIPTION OF THE DRAWINGS

The objects, features and advantages will be apparent to those skilled in the art from the following detailed description and the accompanying drawings in which:

In FIG. 6 the sleeve color is reproduced in the transformed design. In FIG. 6 numeral 10 shows the captured design pattern as a shaded rectangle and Numeral 20 shows the transformed design pattern.

Figure 1:
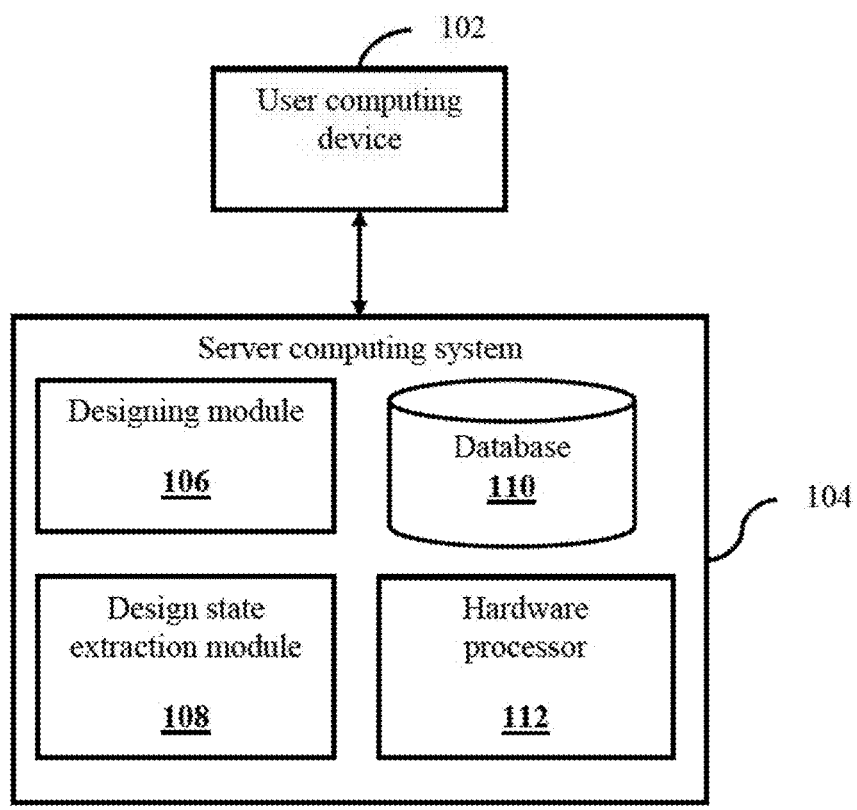
FIG. 1 illustrates a block diagram of a computer system for capturing a design state corresponding to a design pattern embedded on a garment component and transforming captured design state to include dimensional or shape variations, according to an embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments here discloses a computer implemented method for capturing the state of a design pattern embedded on a garment component, for subsequent modification to a different style. The 'design state' is expressed as a combination of a predetermined affine transformation and attributes corresponding to the pattern, text and colors making up the design pattern. The captured designed state is then transformed in accordance with a new style and then applied to the images, text and colors, thereby automatically recreating the original design, but for the garment components embodying the new style.

According to an embodiment herein, a computer implemented method is provided for capturing a design state corresponding to a design pattern embedded on a garment pattern or component and transforming captured design state to incorporate dimensional or shape variations. The method comprises instructions stored on a non-transitory computer readable storage medium and executed on a computing device comprising a hardware processor and memory for capturing a design state corresponding to a design pattern embedded on a garment pattern or component and transforming captured design state to incorporate dimensional or shape variations thereto. The method comprising the steps of identifying a design state representing one or more design pattern embedded on the garment component with a designer module. The design state comprises at least an original height and original width of the design patterns, a first coordinate pair indicating a center point of the design pattern. An original height and an original width of the garment component are identified. An alteration height and alteration width corresponding to the garment component are further identified. A scale factor is calculated based at least on the original height, original width, alteration height and alteration width corresponding to the garment component, using a designer computing system. A plurality of translation factors is calculating with the designer computing system based at least on said original height, original width, alteration height, alteration width corresponding to the garment component and the scale factor. At least the scale factor and the plurality of translation factors are provided as inputs to the computing system through an input device/application interface for an affine transformation operation. The affine transformation operation is executed based on the design state. The affine transformation is performed to modify and reposition each of the original design patterns to the altered width, height and position of the garment component.

According to an embodiment herein, the step of identifying the design state representing the design pattern, further includes the step of identifying at least colors included in the design pattern, textual data embedded on the design pattern, order of arrangement of textual data and colors, and font corresponding to the textual data.

According to an embodiment herein, the step of modifying the original height and original width of the design pattern in accordance with the scaling factor, further includes the following steps of changing the original height and the original width based on the scaling factor; repositioning the first coordinate pair in accordance with the scaling factor; computing an alteration height and alteration width corresponding to the design pattern based on the original height and original width of the design pattern and the scaling factor; and generating a modified design pattern based on the computed alteration height and alteration width corresponding to the design pattern as a characteristic of the design state representative of the design pattern.

According to an embodiment herein, the step of calculating the scale factor further includes the following steps of calculating a first quotient by performing a division operation with the computing system. The first quotient is computed by dividing the alteration width by original width. A second quotient is calculated by performing a division operation with the computing system. The second quotient is computed by dividing the alteration height by original height. The first quotient is compared with the second quotient. The first quotient is selected as the scaling factor only when the first quotient is greater than the second quotient. The second quotient is selected as the scaling factor only when the second quotient is greater than the first quotient.

According to an embodiment herein, the step of calculating the translation factors, further includes the following steps of calculating a first translation factor indicative of transformation of the design pattern in terms of width based on at least the original width of the design pattern, an alteration width corresponding to the design pattern and the scaling factor. A second translation factor indicative of transformation of the design pattern in terms of height is calculated, based on at least the original height of the design pattern, alteration height corresponding to the design pattern and the scaling factor. The first translation or second translation is used for the design transformation accordingly when the first quotient or the second quotient is selected as the scaling factor.

According to an embodiment herein, the step of identifying the design state is performed independently, with the identification of the scale factor, translation factors and the execution of the affine transformation on the said design state being done at a different point in time, on the same or on a different computing device.

With respect to FIG. 1, a computer system 104 is provided for capturing a design state corresponding to a design pattern embedded on a garment component and transforming captured design state to incorporate dimensional or shape variations. The system has software modules comprises instructions executed on a computing device comprising a hardware processor 112 and memory/database 110.

According to an embodiment herein, the system comprises a user computing device 102 connected to a server computing system 104. The server computing system 104 is provided with a designer tool/module 106 for designing a pattern. A design state extraction module 108 is provided to identify a design state representing one or more design pattern embedded on the garment component. The design state comprises at least an original height and original width of the design patterns, a first coordinate pair indicating a center point of the design pattern. An original height and an original width of the garment component are identified. An alteration height and alteration width corresponding to the garment component are further identified. A scale factor is calculated based at least on the original height, original width, alteration height and alteration width corresponding to the garment component. A plurality of translation factors is calculated based at least on said original height, original width, alteration height, alteration width corresponding to the garment component and coordinate data of edge end points corresponding to the design pattern embedded on the garment component. At least the scale factor and the plurality of translation factors are provided as inputs to the computing system for an affine transformation operation. The affine transformation operation is executed on the captured design state. The affine transformation is performed to transform and reposition each of the original design patterns to the altered garment component.

Figure 2:
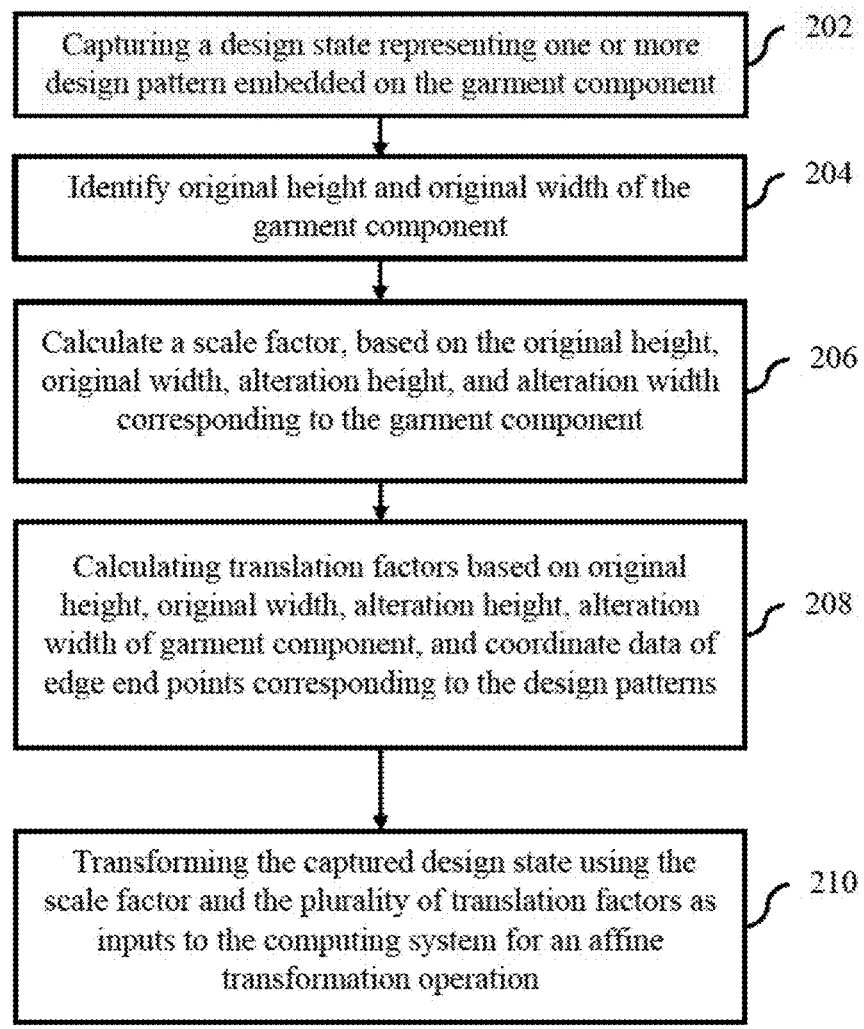
FIG. 2 illustrates a flowchart explaining a method for capturing a design state corresponding to a design pattern embedded on a garment component and transforming captured design state to include dimensional or shape variations, according to an embodiment herein.

FIG. 2 illustrates a flowchart explaining a method for capturing a design state corresponding to a design pattern embedded on a garment pattern or component and transforming captured design state to include dimensional or shape variations, according to an embodiment herein. With respect to FIG. 2, a computer implemented method is provided for capturing a design state corresponding to a design pattern embedded on a garment pattern or component and transforming captured design state to incorporate dimensional or shape variations. The method comprises instructions stored on a non-transitory computer readable storage medium and executed on a computing device comprising a hardware processor and memory for capturing a design state corresponding to a design pattern embedded on a garment pattern or component and transforming captured design state to incorporate dimensional or shape variations thereto. The method comprising the steps of capturing a design state representing one or more design pattern embedded on the garment component with a designer module (202). The design state comprises at least an original height and original width of the design patterns, a first coordinate pair indicating a center point of the design pattern. An original height and an original width of the garment component are identified (204). An alteration height and alteration width corresponding to the garment component are further identified. A scale factor is calculated based at least on the original height, original width, alteration height and alteration width corresponding to the garment component, using a computing system (206). A plurality of translation factors is calculated with the computing system based at least on the original height, original width, alteration height, alteration width of the garment component and the coordinate data of edge points corresponding to the design pattern (208). At least the scale factor and the plurality of translation factors are provided as inputs to the computing system through an input device/interface for an affine transformation operation for transforming the captured design state (210). The affine transformation operation is executed based on the design state. The affine transformation is performed to modify and reposition each of the original design patterns to the altered width, height and position of the garment component.

Figure 3:
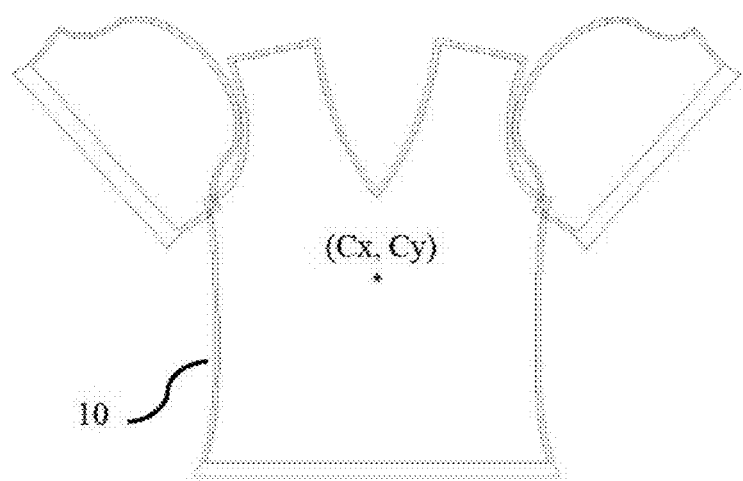
FIG. 3 illustrates a schematic representation of an apparel design for an exemplary women's half sleeved T-shirt with V-neck, in a computer system for capturing a design state corresponding to a design pattern embedded on a garment component, according to an embodiment herein.
Figure 4:
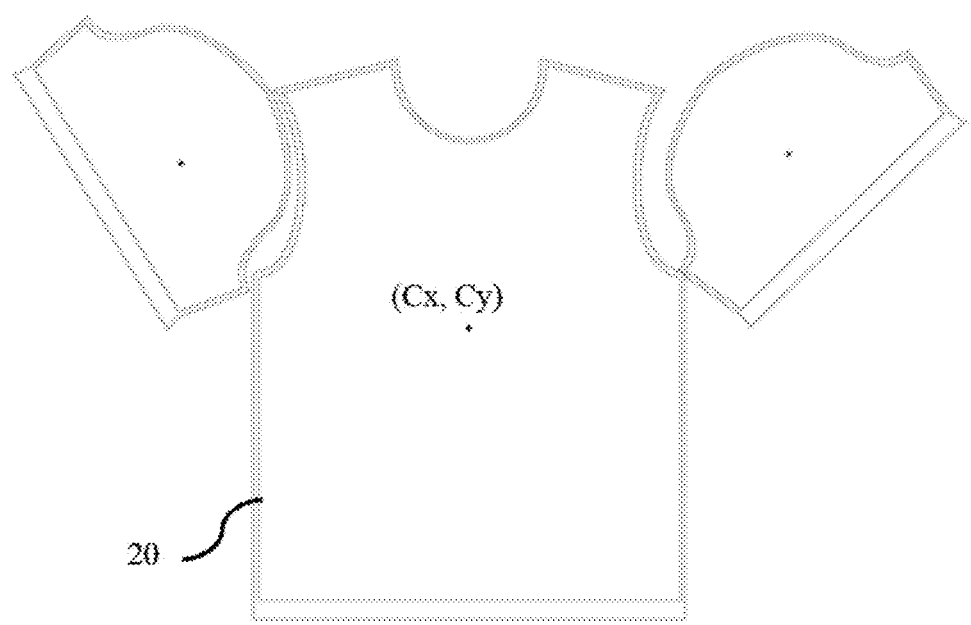
FIG. 4 illustrates a schematic representation of an apparel design for an exemplary Men's half-sleeved T-shirt with U-neck, in a computer system for transforming captured design state according to an embodiment herein.

FIG. 3 illustrates a schematic representation of an apparel design for an exemplary women's half sleeved T-shirt with V-neck, denoted by Numeral 10. The representation of 'back' and 'collar' portions of the T-shirt 10 have been omitted for the sake of brevity and ease of explanation. As shown in FIG. 3, a first central coordinate point of the 'front' portion of the T-shirt 10 is represented by horizontal-axis and vertical-axis coordinates $(Cx, Cy)$ respectively. The front portion of the T-shirt 10 is referred to as a garment component hereafter. For the sake of example, the width of the T-shirt 10 (Front & Back) is considered to be '36' inches and the height of the T-shirt 10 is considered to be '28' inches. FIG. 4 illustrates a schematic representation of an apparel design for an exemplary Men's half-sleeved T-shirt with U-neck denoted by numeral 20. As shown in FIG. 4, a center point of the 'front portion' of the T-shirt 20 is represented by horizontal-axis and vertical-axis coordinates $(Cx', Cy')$ respectively. The front portion of the T-shirt 20 is referred to as a garment component hereafter. In accordance with the present disclosure, the width of the T-shirt 20 (Front & Back) is considered to be '44' inches and the height of the T-shirt 20 is considered to be '30' inches. In the present example, the width of the front portion of the T-shirt denoted by numeral 20 is 22 inches (half of 44"), and wider than the pattern represented by numeral 10 represented in FIG. 3 by 22% (the front portion of the T-shirt 10 is half of 36", which is equal to 18 inches).

Figure 5:
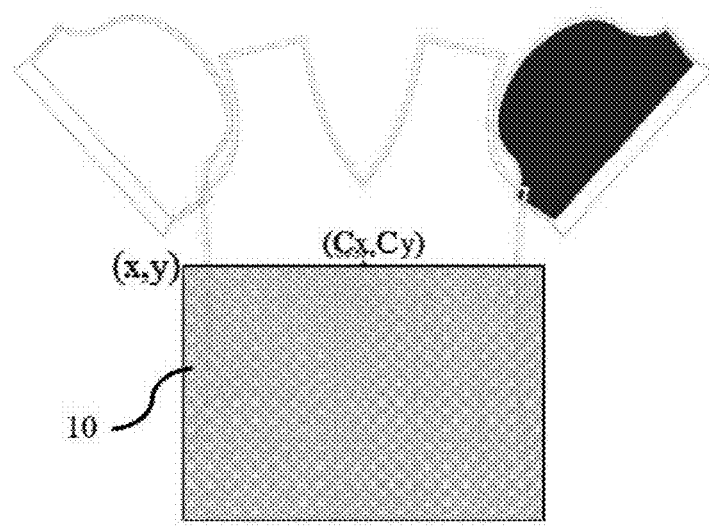
FIG. 5 illustrates a schematic representation of an apparel design for an exemplary women's half sleeved T-shirt with V-neck indicating a step of capturing a design state corresponding to one design pattern and a sleeve color embedded on the garment, according to an embodiment herein.

FIG. 5 illustrates a schematic representation of an apparel design for an exemplary women's half sleeved T-shirt with V-neck indicating a step of capturing a design state corresponding to one design pattern embedded on a garment component. With respect to FIG. 5, a schematic representation of the manner in which the state of the design of the women's T-shirt 10 is captured, is provided. In accordance with the present disclosure, the state of the design of the women's T-shirt 10 is represented by a mathematical function $A(S, R, T)$, wherein A is an affine transformation, S is the scale factor, R is the rotational factor and T is relative translation shown as horizontal and vertical coordinates $(x, y)$ respectively. The state of the design (of the T-shirt 10) further includes a plurality of image attributes such as layer order, font attributes, and pattern attributes (for example, color of left sleeve being 'red').

Figure 6:
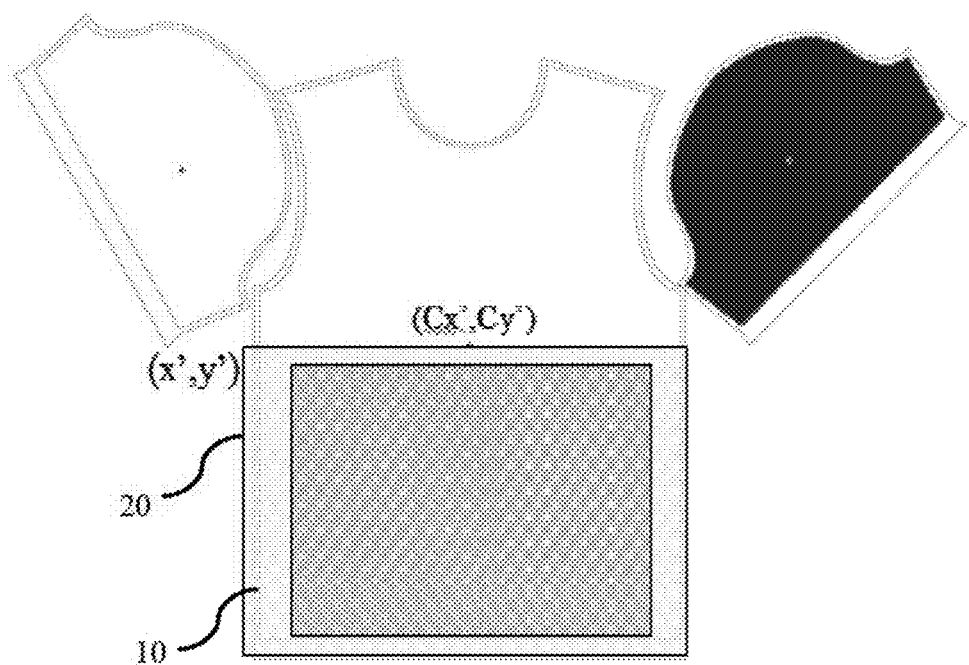
FIG. 6 illustrates a schematic representation of an apparel design for an exemplary Men's half-sleeved T-shirt with U-neck, indicating a step of transforming the captured design in FIG. 5 according to an embodiment herein.

FIG. 6 illustrates a schematic representation of an apparel design for an exemplary Men's half-sleeved T-shirt with U-neck, indicating a step of transforming the design state captured in FIG. 5. With respect to FIG. 6 there is shown a schematic representation of the manner in which the state of the design for the men's T-shirt 20 is reproduced. In accordance with the present disclosure, the state of the design of the men's T-shirt 20 is reproduced using the mathematical function $fn(S, R, T)$, wherein fn is the transformation function, S is the scale factor, R is the rotational factor and T is relative translation shown as horizontal and vertical coordinates $(x, y)$ respectively.

In accordance with the present disclosure, the scale factor $fn(S)$ is calculated using the formulae $Sx=TWx/OWx$; $Sy=TWy/OWy$ and $fn(S)=\max(Sx, Sy)$. TWx is the Width of a Target pattern 20 and OWx is the Width of the Original pattern 10 and TWy and OWy are the corresponding heights of target pattern 20 and the original pattern 10 respectively.

In accordance with the present example in the disclosure, the scale factor $fn(S)$ is calculated to be 22%, and the design pattern on the women's T-shirt 10 is required to be scaled according to the scale factor $fn(S)$.

In accordance with the present disclosure, $fn(T)$ is the translation for fixing a predetermined point on the original pattern to a known point in the target pattern. The translation factor $fn(T)$ is calculated using the formulae $X'=Cx'-Cx*S$;

Y'=CY'−Cy*S; wherein (X', Y') is the new position in 20. In the scaled image the origins are adjusted for scale before transformation.

As shown in FIG. 6, the function fn(S) is used to scale the original design pattern covering the entire (front) portion of the Women's T-shirt 10 to cover the entire (front) portion of the larger men's T-shirt 20, while the function fn(T) repositions the design pattern so that the pattern begins at the left end of the larger men's T-shirt 20, as it did on the comparatively smaller women's T-shirt 10.

In accordance with the present disclosure, the "state" transformation is executed on an entire garment. Alternatively, the state transformation is calculated for each design pattern individually based on its center, for example: Front (Cx, Cy), Left (Cx, Cy), etc. Alternatively, keeping in view the computation speed, scaling factors and rotation factors are applied for an entire garment, while the transformation is computed per pattern.

Figure 7:
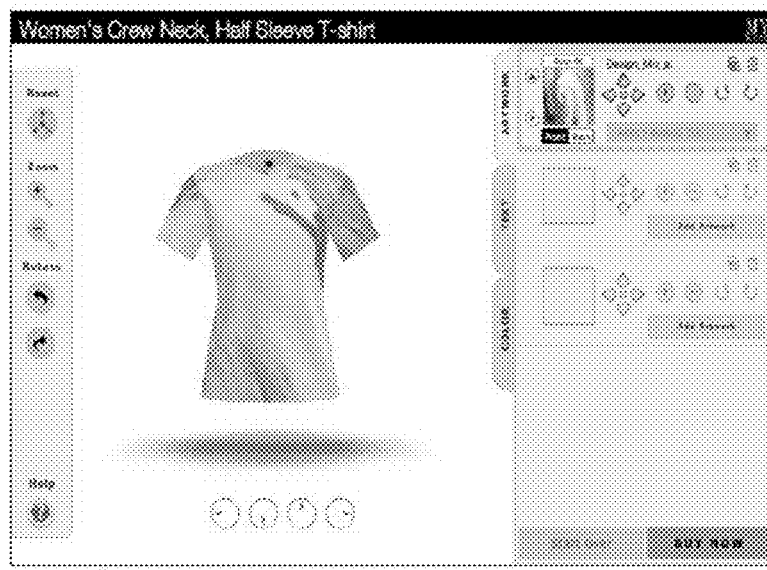
FIG. 7 illustrates a screenshot of a real system capturing the design state corresponding to a design pattern embedded on a garment component of a women's half sleeved T-shirt with V-neck, according to an embodiment herein.

FIG. 7 illustrates a screenshot of a real system capturing the design state corresponding to a design pattern embedded on a garment component of a women's half sleeved T-shirt with V-neck using the system and method envisaged by the present disclosure.

Figure 8:
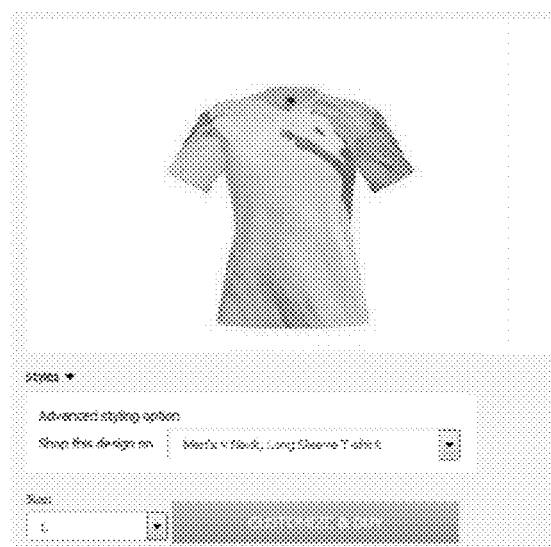
FIG. 8 illustrates a screen shot of graphical user interface showing the step of a designer selecting a transformation for the design state captured in FIG. 7, according to an embodiment herein.

FIG. 8 illustrates a screen shot of graphical user interface showing the step of a designer selecting a transformation for the design state captured in FIG. 7 according to an embodiment herein. Referring to FIG. 8, there is shown a selection of the design depicted in FIG. 7 for transformation onto Men's V-neck Long sleeved T-shirt 40, among many other possible styles.

Figure 9:
FIG. 9 illustrates a screen shot of a real system transforming the design captured in FIG. 7 to a Men's half-sleeved T-shirt with U-neck, according to an embodiment herein.

FIG. 9 illustrates a screen shot of a real system transforming the design state captured in FIG. 7 to a Men's half-sleeved T-shirt with U-neck using the system and method envisaged by the present disclosure. Referring to FIG. 9, there is shown a transformation of the design depicted in FIG. 7 to the chosen style in FIG. 8, while accurately retaining the visual elements of the original design. FIG. 7 to FIG. 9 show the automatic extrapolation of a design from one style to another Thus, this invention outlines a novel method for capturing the "state" of an intended design on an apparel pattern, and subsequently transforming that "state" to a new style or size and then applying that modified "state" to automatically recreate the original design, but for the new style or size. The technical advantages envisaged by the present disclosure include the realization of a computer implemented system and method that enables designers to seamlessly extrapolate design patterns across apparels and accessories of various sizes and types so that a single garment design can be utilized across multiple garments or accessories of different sizes and styles automatically, thereby saving time, while retaining design accuracy. The automated system and method obviates the need for creating individual design for each style or size, while ensuring that the transformed designs retain their visual characteristics even upon extrapolation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A computer implemented method comprising instructions stored on a non-transitory computer readable storage medium and executed on a computing device comprising a hardware processor and memory for capturing a design status or condition corresponding to a design pattern embedded on a garment pattern or component and transforming captured design status or condition to incorporate dimensional or shape variations thereto, the method comprising the steps:

identifying a design status or condition of a design representing one or more design patterns embedded on the garment component, and wherein the design status or condition of the design comprises at least an original height and original width of the one or more design patterns, and a first coordinate pair indicating a center point of the one or more design patterns;

identifying an original height and an original width of the garment component, and further identifying an alteration height and alteration width corresponding to the garment component;

calculating a scale factor, based at least on the original height, original width, alteration height and alteration width corresponding to the garment component;

calculating a plurality of translation factors, based at least on the original height, original width, alteration height, alteration width corresponding to the garment component and the scale factor;

providing at least the scale factor and the plurality of translation factors as inputs to the computing device through an input device/interface for an affine transformation operation, and executing the affine transformation operation on the design status or condition of the design;

wherein the affine transformation is performed to modify and reposition each of the original design patterns to the altered width, height and position of the garment component.

2. The method as claimed in claim 1, wherein the step of identifying the design status or condition of the design representing the one or more design patterns, further includes the step of identifying at least colors included in the one or more design patterns, a textual data embedded on the one or more design patterns, an order of arrangement of the textual data and colors, and a font corresponding to the textual data.

3. The method as claimed in claim 1, wherein the step of modifying the original height and original width of the one or more design patterns in accordance with the scale factor, further includes the following steps:

changing the original height and the original width based on the scale factor;

repositioning the first coordinate pair, in accordance with the scale factor;

computing an alteration height and alteration width corresponding to the one or more design patterns, based on the original height and original width of the one or more design patterns, and the scale factor; and generating a modified design pattern based on the computed alteration height and alteration width corresponding to the one or more design patterns as a characteristic of the design status or condition representative of the one or more design patterns.

4. The method as claimed in claim 1, wherein the step of calculating the scale factor further includes the following steps:
- calculating a first quotient by performing a division operation with the computing device, and wherein the first quotient is computed by dividing the alteration width by original width;
- calculating a second quotient by performing a division operation with the computing device, and wherein the second quotient is computed by dividing the alteration height by original height;
- comparing the first quotient with the second quotient, and wherein the first quotient is selected as the scale factor only when the first quotient is greater than the second quotient, and wherein the second quotient is selected as the scale factor only when the second quotient is greater than the first quotient.

5. The method as claimed in claim 1, wherein the step of calculating the translation factors, further includes the following steps:
- calculating a first translation factor indicative of the affine transformation of the one or more design patterns in terms of width, based on at least the original width of the one or more design patterns, alteration width corresponding to the one or more design patterns and the scale factor; and
- calculating a second translation factor indicative of the affine transformation of the one or more design patterns in terms of height, based on at least the original height of the one or more design patterns, alteration height corresponding to the one or more design patterns and the scale factor; and
- wherein the first translation or second translation is used for the affine transformation of the one or more designs accordingly when a first quotient or a second quotient is selected as the scale factor.

6. The method as claimed in claim 1, wherein the step of identifying the design status or condition of the design is performed independently, with the identification of the scale factor, translation factors and the execution of the affine transformation on the design status or condition of the design being done at a different point in time, on the same or on a different computing device.

* * * * *